US012356524B2

(12) United States Patent
Zhao

(10) Patent No.: US 12,356,524 B2
(45) Date of Patent: Jul. 8, 2025

(54) DUAL-MODE OUTPUT DIMMING POWER SUPPLY

(71) Applicant: Zhuhai Shengchang Electronics Co., Ltd., Zhuhai (CN)

(72) Inventor: Xianyun Zhao, Chongqing (CN)

(73) Assignee: Zhuhai Shengchang Electronics Co., Ltd., Zhuhai (CN)

( * ) Notice: Subject to any disclaimer, the term of this patent is extended or adjusted under 35 U.S.C. 154(b) by 126 days.

(21) Appl. No.: 18/512,543

(22) Filed: Nov. 17, 2023

(65) Prior Publication Data

US 2024/0196496 A1 Jun. 13, 2024

(30) Foreign Application Priority Data

Dec. 8, 2022 (CN) ........................ 202211569486.1

(51) Int. Cl.

*H05B 45/3725* (2020.01)
*H05B 45/10* (2020.01)
*H05B 45/325* (2020.01)

(52) U.S. Cl.

CPC ......... *H05B 45/3725* (2020.01); *H05B 45/10* (2020.01); *H05B 45/325* (2020.01)

(58) Field of Classification Search

CPC .. H05B 45/3725; H05B 45/10; H05B 45/325; H05B 45/385; H05B 47/25
See application file for complete search history.

(56) References Cited

U.S. PATENT DOCUMENTS 10,039,167 B1 * 7/2018 Zheng .................... H05B 45/10
2019/0373692 A1 * 12/2019 Zheng ................ H05B 45/3725
2021/0392729 A1 * 12/2021 Zheng .................... H05B 45/10

* cited by examiner

*Primary Examiner* — Minh Tran
(74) *Attorney, Agent, or Firm* — Wang Law Firm, Inc.

(57) ABSTRACT

A dual-mode output dimming power supply includes an electromagnetic filter circuit, a switching power supply main control circuit, a transformer and a rectifier filter circuit sequentially connected to one another. The rectifier filter circuit has an output terminal connected to a feedback regulation loop and a positive electrode of a lamp; the feedback regulation loop is connected to the switching power supply main control circuit; the single-chip micro-controller circuit is connected to the feedback regulation loop, a PWM drive circuit, a mode switching circuit and a dimming signal processing circuit; the PWM drive circuit has an output terminal connected to a gate of a MOS tube; the MOS tube has a drain connected to a resistor and a source connected to a negative electrode of a lamp. The invention allows users to freely switch to a voltage regulation mode or a PWM mode for output through mode switching.

4 Claims, 7 Drawing Sheets

DUAL-MODE OUTPUT DIMMING POWER SUPPLY

FIELD OF INVENTION

The present invention is related to the technical field of a dimming power supply, and more particularly related to a dual-mode output dimming power supply.

BACKGROUND OF THE INVENTION

LED lighting has become a mainstream in the field of lighting, and there are various kinds of LED lamps on the market. With the improved living standard, people have increasingly higher requirements for lighting, especially a dimmable lamp with the flicker-free, noise-free, high-brightness, high-efficiency, high color rendering index, and good dimming effects has become a common requirement. However, different lamps or applications have different requirements for the dimming power supply and also have different requirements for the dimming output mode. Some applications require the output in a voltage regulation mode, and some application require the output in a PWM mode. In general, the power supplies on the market either come with the voltage regulation mode or the PWM mode, but there is a lack of the dimming power supply with both output modes.

SUMMARY OF THE INVENTION

In order to overcome the deficiencies of the prior art, it is a primary objective of the present invention to provide a dual-mode output dimming power supply.

To achieve the above objective, the present invention provides the following solution:

A dual-mode output dimming power supply includes:

an electromagnetic filter circuit, a switching power supply main control circuit, a transformer, a rectifier filter circuit, a feedback regulation loop, a single-chip microcontroller circuit, a PWM drive circuit, a mode switching circuit, a dimming signal processing circuit, a MOS tube and a resistor.

The electromagnetic filter circuit, the switching power supply main control circuit, the transformer and the rectifier filter circuit are sequentially connected to one another; the rectifier filter circuit has an output terminal connected to the feedback regulation loop and a positive electrode of a lamp. The feedback regulation loop is connected to the switching power supply main control circuit. The single-chip microcontroller circuit is connected to the feedback regulation loop, the PWM drive circuit, the mode switching circuit and the dimming signal processing circuit. The PWM drive circuit has an output terminal connected to a gate of the MOS tube. The MOS tube has a drain connected to the resistor and a source connected to a negative electrode of the lamp.

Preferably, the resistor is connected to a sampling signal source; the sampling signal source outputs a current and passes it through the resistor to step down the voltage, so as to achieve the short circuit protection and overcurrent protection for a circuit; and the sampling signal source is connected to the feedback regulation loop or the single-chip microcontroller circuit.

Preferably, the dimming signal processing circuit includes a plurality of dimming signal sampling subcircuits; and each dimming signal sampling subcircuit is connected to the single-chip microcontroller circuit.

Preferably, the dual-mode output dimming power supply of the present invention further includes a photocoupler installed between the switching power supply main control circuit and the feedback regulation loop.

The feedback regulation loop has a terminal connected to the photocoupler and another terminal connected to the switching power supply main control circuit.

According to the specific embodiments of the present invention, the present invention has disclosed the following technical effects:

The present invention provides a dual-mode output dimming power supply, including: an electromagnetic filter circuit, a switching power supply main control circuit, a transformer, a rectifier filter circuit, a feedback regulation loop, a single-chip microcontroller circuit, a PWM drive circuit, a mode switching circuit, a dimming signal processing circuit, a MOS tube and a resistor. The electromagnetic filter circuit, the switching power supply main control circuit, the transformer and the rectifier filter circuit are sequentially connected to one another. The rectifier filter circuit has an output terminal connected to the feedback regulation loop and a positive electrode of a lamp. The feedback regulation loop is connected to the switching power supply main control circuit. The single-chip microcontroller circuit is connected to the feedback regulation loop, the PWM drive circuit, the mode switching circuit and the dimming signal processing circuit. The PWM drive circuit has an output terminal connected to a gate of the MOS tube. The MOS tube has a drain connected to the resistor and a source connected to a negative electrode of the lamp. The present invention allows users to freely switch to a voltage regulation mode or a PWM mode through mode switching for the output as required.

BRIEF DESCRIPTION OF THE DRAWINGS

In order to more clearly illustrate the embodiments of the present invention or the technical solutions of the prior art, the following drawings illustrating the implementation of the embodiments are used for brief introduction. It is obvious that the following description of the drawings are only some of the embodiments of the present invention. As to the persons having ordinary skill in the art, other drawings can also be obtained from the following drawings without creative effort or labor.

DETAILED DESCRIPTION OF THE PREFERRED EMBODIMENTS

The technical solutions in the embodiments of the present invention will be clearly and comprehensively described in conjunction with the accompanying drawings in the embodiments of the present invention as follows. Obviously, the described embodiments are only part of the embodiments, but not all embodiments of the present invention. Based on the embodiments in the invention, all other embodiments obtained by those having ordinary skill in the art without making creative efforts shall also fall within the scope of protection of the invention.

The term “embodiment” mentioned in this specification herein means that a particular feature, structure, or characteristic described together with an embodiment may be included in at least one embodiment of the present application. The presence of the term “embodiment” at various parts of the specification does not necessarily refer to the same embodiment, nor is it a separate or alternative embodiment that is mutually exclusive of other embodiments. It is understood by those skilled in the art, both explicitly and implicitly, that the embodiments described herein may be combined with other embodiments.

The terms “first”, “second”, “third”, “fourth”, etc. in the specification, claims and accompanying drawings of the present application are used to distinguish between different objects and are not intended to describe a particular order. In addition, the terms “comprises” and “has”, and any of their variations are intended to cover non-exclusive inclusion. For example, the inclusion of a series of steps, processes, methods, devices, etc. is not limited to the listed steps, processes, methods, devices, etc., but optionally includes the steps, processes, methods, devices etc. that are not listed, or optionally includes other steps, processes, methods, devices etc. that are inherent to those listed.

It is an objective of the present invention to provide a dual-mode output dimming power supply, which allows users to freely switch to a voltage regulation mode or a PWM mode for the output according to requirements through mode switching.

The objective, characteristics and advantages of the present invention will become apparent in the following detailed description of the preferred embodiments with reference to the accompanying drawings.

Figure 1:
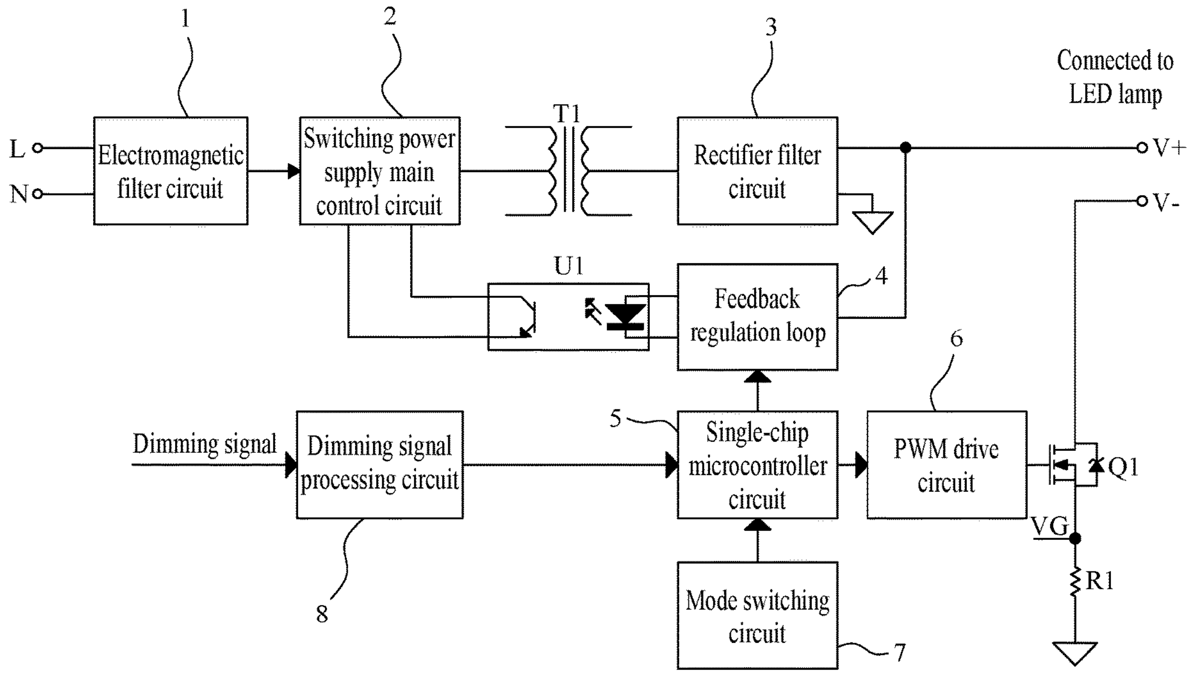
FIG. 1 is a schematic circuit diagram showing the principle of an embodiment of the present invention.

In FIG. 1, the present invention has an input terminal connected to a live wire L and a neutral wire N of a utility power. After passing through the input terminal and being filtered by an electromagnetic filter circuit 1, utility power is inputted to a switching power supply main control circuit 2. The switching power supply main control circuit 2 and a transformer T1 convert the energy to a transformer T1 secondary level and rectify and filter the energy by a rectifier filter circuit 3 into a working voltage required by an LED lamp (where, the output terminal of the rectifier filter circuit 3 is connected to a positive electrode V+ of the LED lamp). When it is necessary to perform a dimming operation, an external dimmer is adjusted to change a dimming signal to be inputted to a dimming signal processing circuit 8 and converted and outputted as a dimming signal which can be recognized by a single-chip microcontroller circuit 5. The single-chip microcontroller circuit 5 outputs a corresponding dimming instruction signal which can be executed by a PWM drive circuit 6 or a feedback regulation loop 4 according to the dimming signal inputted by the dimming signal processing circuit 8. The mode switching circuit 7 provides a signal to the single-chip microcontroller circuit 5 to determine whether to output the dimming instruction to the PWM drive circuit 6 or to the feedback regulation loop 4; wherein when the single-chip microcontroller circuit 5 outputs the dimming instruction to the PWM drive circuit 6, the single-chip microcontroller circuit 5 will output a maximum brightness signal to the feedback regulation loop 4, and the single-chip microcontroller circuit 5 outputs the dimming instruction to the feedback regulation loop 4, the single-chip microcontroller circuit 5 outputs the maximum brightness signal to the PWM drive circuit 6. When the single-chip microcontroller circuit 5 outputs the dimming instruction to the PWM drive circuit 6 and the maximum brightness signal to the feedback regulation loop 4, the feedback regulation loop 4 will control the switching power supply main control circuit 2 by collecting samples of the output voltage and maximum brightness signal and processing the samples by a photocoupler U1, so as to drive the power supply to stably output a rated maximum voltage, and the PWM drive circuit 6 will adjust the dimming instruction signal and then drive the MOS tube Q1 to change the duty cycle of the MOS tube Q1, and adjust the brightness of the LED lamp connected to the output terminal of the dimming power supply. Since the dimming instruction signal outputted by the single-chip microcontroller circuit 5 to the PWM drive circuit 6 is a PWM signal, the power supply is in the PWM output dimming mode at this time. When the single-chip microcontroller circuit 5 outputs the dimming instruction to the feedback regulation loop 4 and the maximum brightness signal to the PWM drive circuit 6, the PWM drive circuit 6 will always output a high electrical level and will always keep the MOS tube Q1 conducted, and the feedback regulation loop 4 will process the dimming instruction and the sampled output voltage and control the switching power supply main control circuit 2 through the photocoupler U2 to change the output voltage of the power supply, so as to adjust the brightness of the LED lamp connected to the output terminal of the dimming power supply. Since the single-chip microcontroller circuit 5 outputs the dimming instruction through the feedback regulation loop 4 to control the switching power supply main control circuit 2, so as to change the output voltage of the power supply, therefore the dimming power supply is in the voltage regulation dimming mode at this time. As described above, the mode switching function of the mode switching circuit 7 is provided for selecting and setting the power output to the voltage regulation mode or the PWM mode. The resistor R1 has a current limiting effect in the circuit, and the voltage signal VG of the resistor R1 is a sampling signal source with protection functions such as the short circuit protection and the overcurrent protection, and is generally connected to the feedback regulation loop 4 or the single-chip microcontroller circuit 5 to achieve the short circuit protection and the overcurrent protection.

Figure 2:
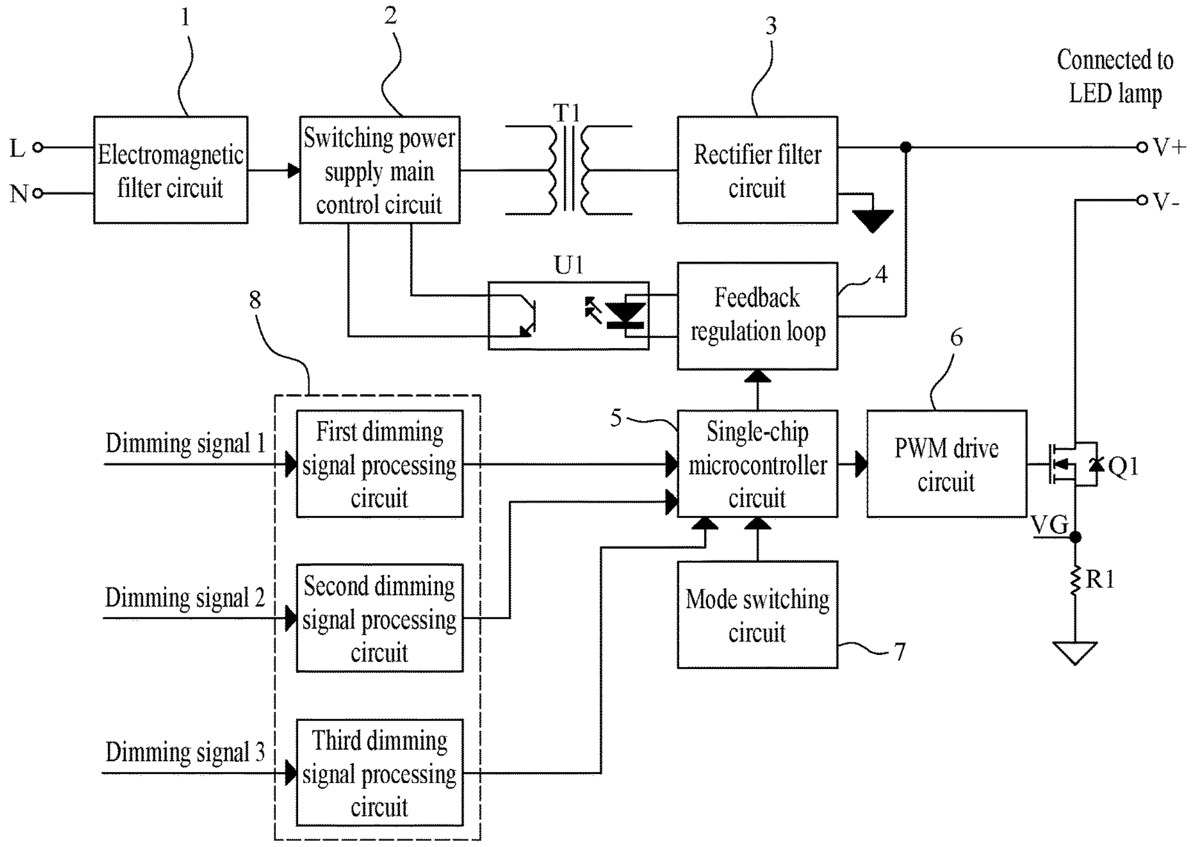
FIG. 2 is a schematic circuit diagram showing the principle applied in an all-in-one dimming power supply of an embodiment of the present invention.

With reference to FIG. 2, the present invention can be applied to an all-in-one dimming power supply, and after the dimming signal processing circuit 8 processes a plurality of dimming signals and inputs them into the single-chip microcontroller circuit 5, the single-chip microcontroller circuit 5 will determine which path to control the dimming signal and output a corresponding dimming instruction to the PWM drive circuit 6 or the feedback regulation loop 4 to achieve the all-in-one dimming effect and the switching function of the output mode of the dimming power supply.

Figure 3:
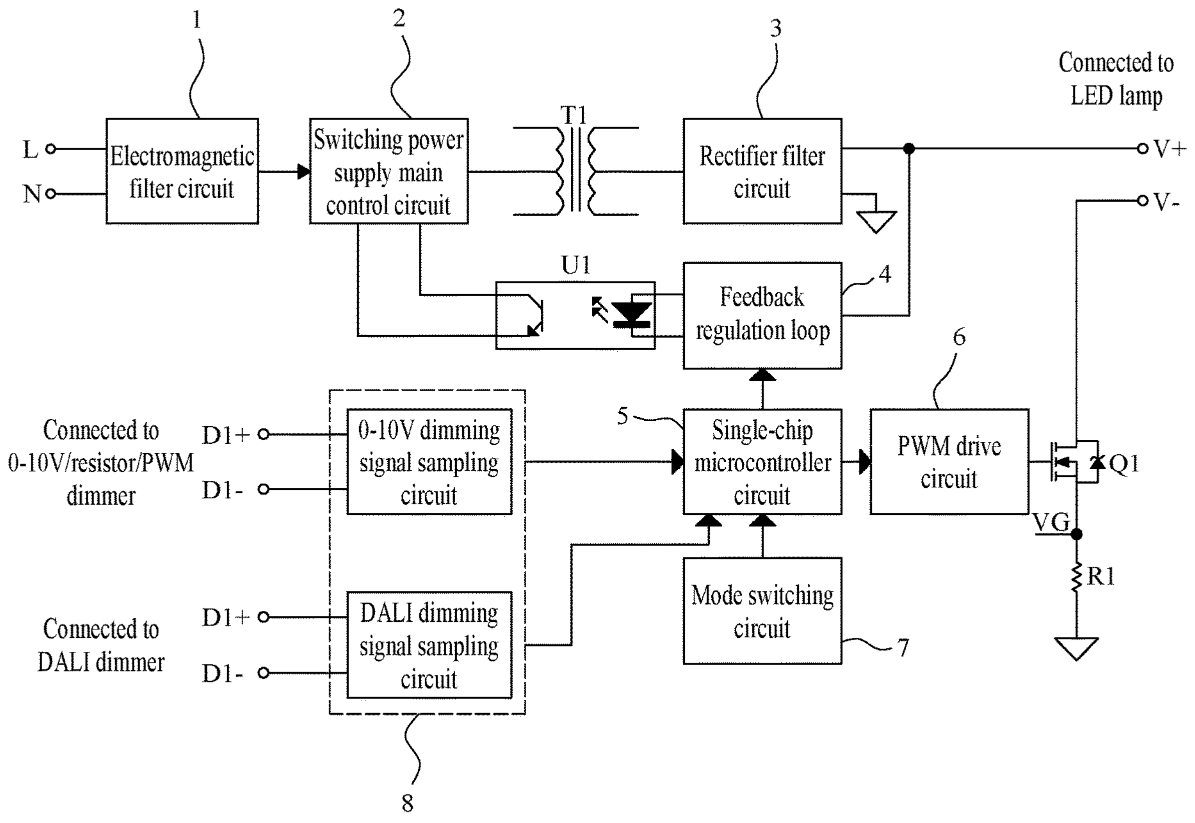
FIG. 3 is a schematic circuit diagram showing the principle of the first type of circuit of an embodiment of the present invention.
Figure 4:
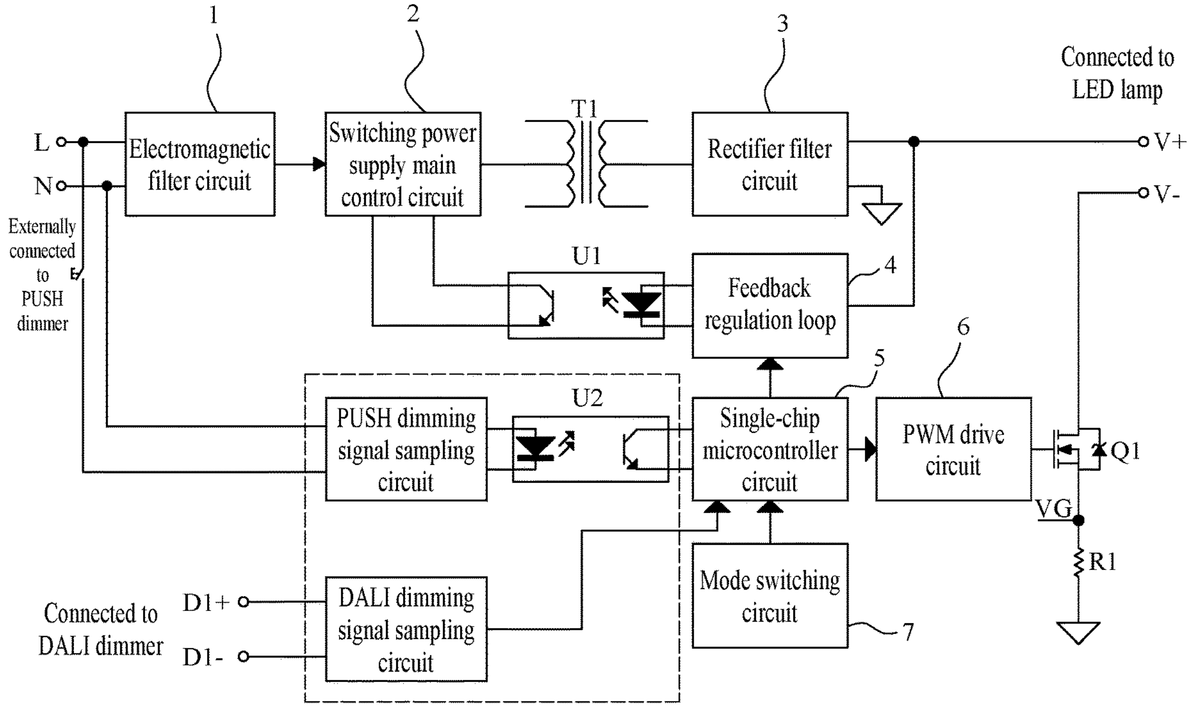
FIG. 4 is a schematic circuit diagram showing the principle of the second type of circuit of an embodiment of the present invention.
Figure 5:
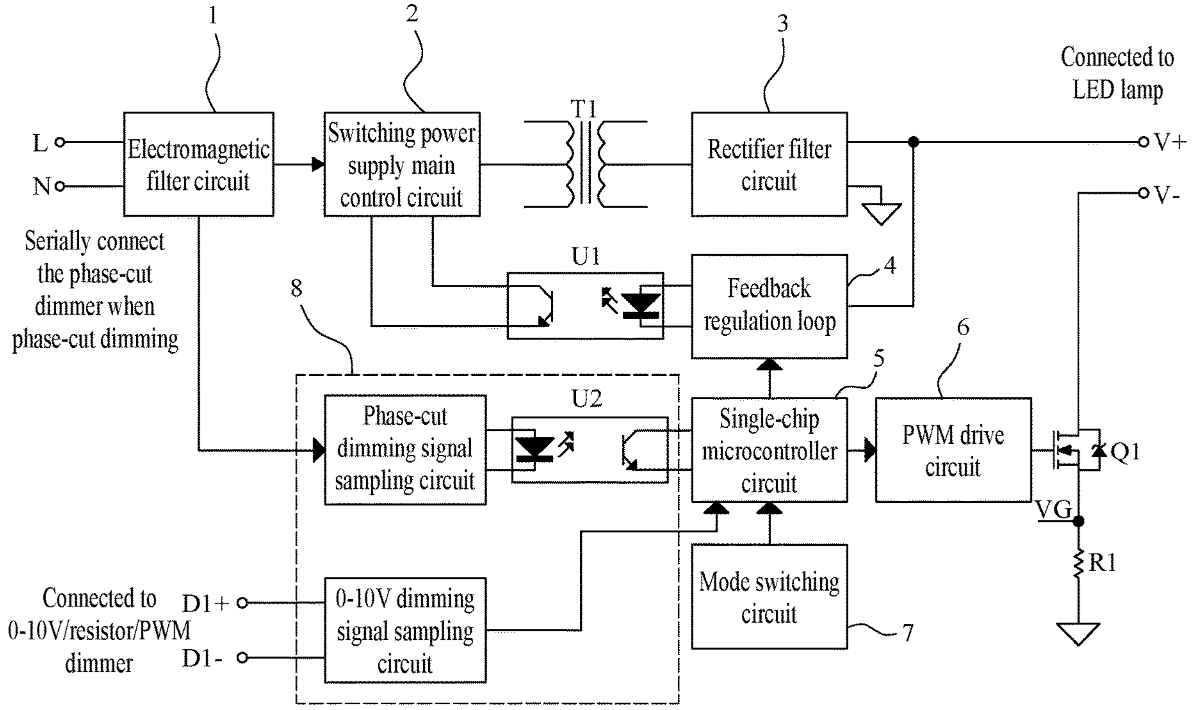
FIG. 5 is a schematic circuit diagram showing

With reference to FIGS. 3 to 5 for some of the typical embodiments adopted in the all-in-one dimming power supply, these embodiments are just the common embodiments, there are many other embodiments not described here, their nature is that the number of dimming signal paths of the dimming signal processing circuit 8 is different and the dimming method is changed, and all these changes are within the protection scope of the present invention.

Figure 6:
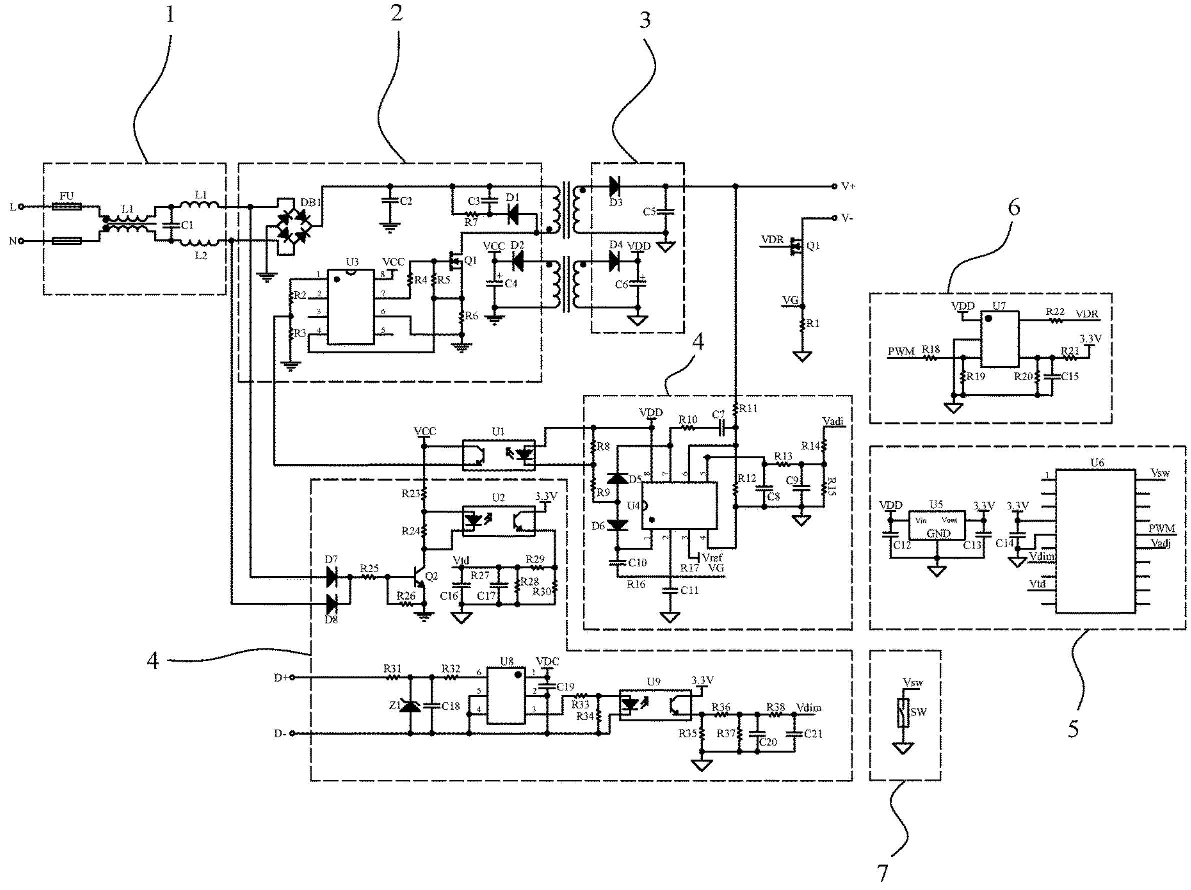
FIG. 6 is a detailed circuit diagram showing the principle of the third type of circuit of an embodiment of the present invention.

With reference to FIG. 6 for a practical embodiment of an all-in-one dual-mode output dimming power supply based on FIG. 5, it is noteworthy that the switching power supply main control circuit 2 can be a switching power supply circuit with a forward, half-bridge, full-bridge, LLC, LCC, BUCK, BOOST or other circuit architecture, in addition to the switching power supply circuit with the flyback architecture as shown in FIG. 6, and the switching power supply main control circuit is formed by the aforementioned architectures plus the active or passive power factor correction circuits, wherein the photocoupler U1 can be omitted in the BUCK or BOOST architecture, but it still falls within the scope of the present invention. Some change or modification to other circuits of the present invention without departing from the nature of the circuit are covered within the scope of the present invention.

Figure 7:
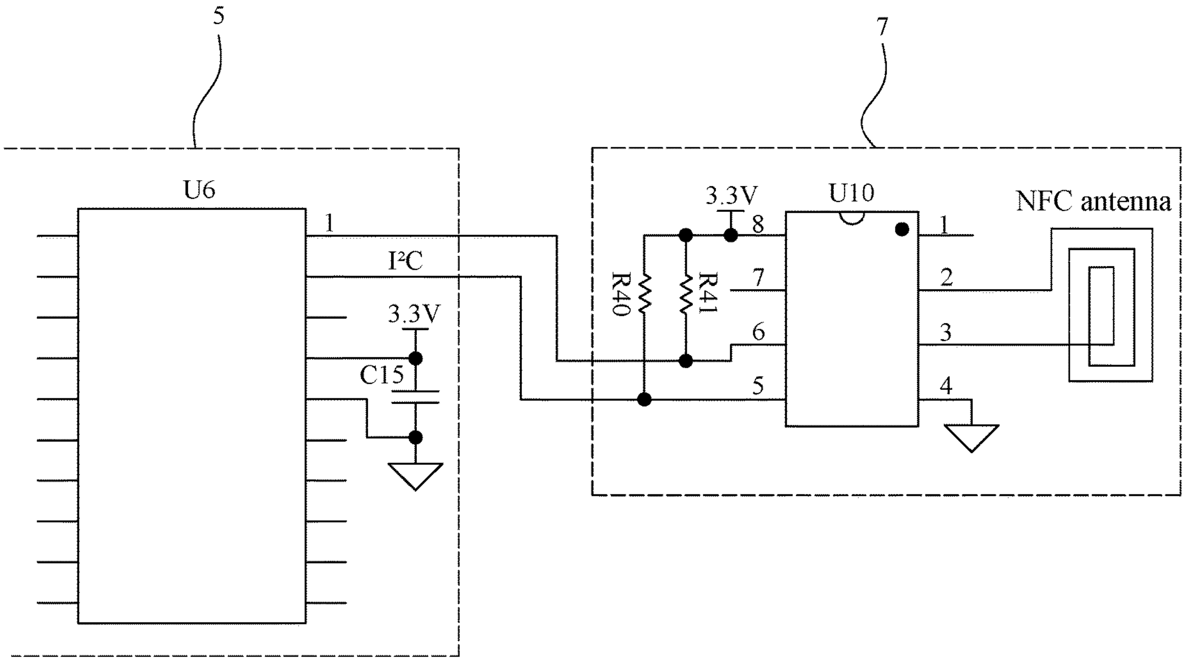
FIG. 7 is a schematic circuit diagram showing the principle of a mode switching circuit of an embodiment of the present invention.

In FIG. 7, the mode switching circuit 7 can be implemented by an NFC method in addition to the switching method as shown in FIG. 6, and an NFC chip writes in the mode switching information to change the output mode of the single-chip microcontroller circuit 5. Besides this method, other methods used by the single-chip microcontroller circuit 5 to change its output mode also fall within the scope of the present invention.

The embodiments in this specification are described in an incremental manner, each embodiment focuses on the differences with the other embodiments, and same or similar parts between the embodiments are provided for mutual reference.

While the principle and implementation method of the invention are described in some detail hereinbelow with reference to certain illustrated embodiments, it is to be understood that these embodiments are only intended for helping to understand the methodology of the present invention and its core ideas; there is no intent to limit the scope of the invention. To the contrary, it is intended to cover various modifications, alternatives and equivalents, and the scope of the appended claims therefore should be accorded the broadest interpretation so as to encompass all such modifications and similar 10 arrangements and procedures. In summary, the contents of this document should not be construed as a limitation of the present invention.

What is claimed is:

1. A dual-mode output dimming power supply, comprising:

an electromagnetic filter circuit, a switching power supply main control circuit, transformer, a rectifier filter circuit, a feedback regulation loop, a single-chip microcontroller circuit, a PWM drive circuit, a mode switching circuit, a dimming signal processing circuit, a MOS tube and a resistor;

wherein, the electromagnetic filter circuit, the switching power supply main control circuit, the transformer and the rectifier filter circuit are sequentially coupled to one another;

the rectifier filter circuit has an output terminal coupled to the feedback regulation loop and a positive electrode of a lamp; the feedback regulation loop is coupled to the switching power supply main control circuit; and the single-chip microcontroller circuit is coupled to the feedback regulation loop, the PWM drive circuit, the mode switching circuit and the dimming signal processing circuit;

the PWM drive circuit has an output terminal coupled to a gate of the MOS tube; and the MOS tube has a drain coupled to the resistor and a source coupled to a negative electrode of the lamp.

2. The dual-mode output dimming power supply according to claim 1, wherein the resistor is coupled to a sampling signal source; the sampling signal source outputs a current which passes through the resistor to step down the voltage and achieve the short circuit protection and overcurrent protection of the circuit; the sampling signal source is coupled to the feedback regulation loop or the single-chip microcontroller circuit.

3. The dual-mode output dimming power supply according to claim 1, wherein the dimming signal processing circuit comprises a plurality of dimming signal sampling subcircuits, and each dimming signal sampling subcircuit is coupled to the single-chip microcontroller circuit.

4. The dual-mode output dimming power supply according to claim 1, further comprising a photocoupler installed between the switching power supply main control circuit and the feedback regulation loop;

wherein, the feedback regulation loop is coupled to a terminal of the photocoupler; and another terminal of the photocoupler is coupled to the switching power supply main control circuit.

* * * * *